United States Patent
Niggeman

[19]

[11] Patent Number: 5,956,960
[45] Date of Patent: Sep. 28, 1999

[54] MULTIPLE MODE ENVIRONMENTAL CONTROL SYSTEM FOR PRESSURIZED AIRCRAFT CABIN

[75] Inventor: Richard E. Niggeman, Rockford, Ill.

[73] Assignee: Sundstrand Corporation, Rockford, Ill.

[21] Appl. No.: 08/925,557

[22] Filed: Sep. 8, 1997

[51] Int. Cl.⁶ .................................................... B28B 9/00
[52] U.S. Cl. ............................... 62/172; 60/39.07; 62/402
[58] Field of Search ............................... 62/172, 402, 86; 60/39.07

[56] References Cited

U.S. PATENT DOCUMENTS

| | | |
|---|---|---|
| 2,327,737 | 8/1943 | Pendergast. |
| 2,328,489 | 8/1943 | Pfau. |
| 2,734,356 | 2/1956 | Kleinhans. |
| 2,734,443 | 2/1956 | Wood. |
| 2,767,561 | 10/1956 | Seeger. |
| 2,777,301 | 1/1957 | Kuhn. |
| 3,326,109 | 6/1967 | Markham. |
| 3,486,435 | 12/1969 | Holt. |
| 4,091,613 | 5/1978 | Young .................................. 60/39.07 |
| 4,334,411 | 6/1982 | Payne ....................................... 62/86 |
| 4,419,926 | 12/1983 | Cronin et al. ............................. 237/11 |
| 4,523,517 | 6/1985 | Cronin. |
| 4,553,407 | 11/1985 | Rannenberg ............................ 62/402 |
| 4,684,081 | 8/1987 | Cronin ..................................... 244/58 |
| 4,875,345 | 10/1989 | Signoret ................................... 62/402 |
| 5,086,625 | 2/1992 | Momose et al. ......................... 62/172 |
| 5,442,905 | 8/1995 | Claeys et al. .......................... 60/39.07 |

*Primary Examiner*—Ronald Capossela
*Attorney, Agent, or Firm*—Wood, Phillips, VanSanten, Clark & Mortimer

[57] ABSTRACT

The need for engine bleed air in a cabin pressurizing/ventilation ECS system for aircraft is avoided in a construction including a pressurizable aircraft cabin (10) having a cabin air inlet (20) and a cabin air outlet (22). The system includes a ram air inlet (34) and an aircraft exhaust air outlet (42) along with a motor operated vapor compression cabin air cooling system (24) having an inlet (28) and an outlet (26). A turbomachine (40) includes a compressor (32) connected between the ram air inlet (34) and the cooling system inlet (28) along with a combustion turbine (38) and a power recovery turbine (41), both mechanically coupled to the compressor and connected between the aircraft exhaust air outlet (42) and the cabin air outlet (22). A motor/generator (36) is coupled to the compressor (32) and the turbines (38, 41) and is operable to drive the compressor (32) when operating as a motor and to be driven by the combustion turbine (38) when operating as a generator. A combustor (46) is connected to the combustion turbine (38) for selectively providing gasses of combustion to the combustion turbine (38) to drive the same and a heat exchanger includes a first fluid flow path (52) interconnecting the compressor (32) and the cabin (10) and a second fluid flow path (54) interconnecting the cabin (10) and the power recovery turbine (41).

12 Claims, 3 Drawing Sheets

5,956,960

MULTIPLE MODE ENVIRONMENTAL CONTROL SYSTEM FOR PRESSURIZED AIRCRAFT CABIN

FIELD OF THE INVENTION

This invention relates to aircraft of the type having pressurized cabins, and more specifically, to a pressurizing and environmental control system for such aircraft.

BACKGROUND OF THE INVENTION

As would be expected, operators of commercial aircraft and their suppliers conduct an unending search for ways to reduce the operating costs of their aircraft. One point of focus in this search is cabin pressurization and environmental control systems (ECS). In current practice, propulsion engine bleed air from the turbine engines of such aircraft is employed for both ventilation and pressurization, the bleed air being utilized as fresh air to replace some portion of the air being circulated in a cabin. The use of bleed air from the engine may be the single largest operating cost factor in providing necessary secondary power and environmental control functions for the aircraft.

Moreover, as turbine engine technology improves, the bypass ratio of the engines is being increased and air flow in the engine core reduced, further reducing the availability of bleed air for pressurization and ventilation. Consequently, it is desirable to avoid, to the extent possible, the use of bleed air in aircraft ECS's. The present invention is directed to achieving that goal.

SUMMARY OF THE INVENTION

It is the principal object of the invention to provide a new and improved ECS for aircraft that minimizes and/or avoids altogether the need for the use of bleed air in the operation of the ECS. It is also an object of the invention to provide an ECS that recovers energy from the aircraft cabin exhaust airstream and which is capable in operating in multiple modes, including that of an auxiliary power unit (APU).

An exemplary embodiment of the invention achieves the foregoing object in a multiple mode ECS system for pressurized cabin aircraft which includes an aircraft cabin having a cabin air inlet and a cabin air outlet, a ram air inlet and an aircraft exhaust air outlet. A vapor compression cabin air cooling system includes an outlet connected to the cabin air inlet as well as a pressurization and ventilating air inlet and a turbomachine including a compressor connected between the ram air inlet and the cooling system inlet and both a combustion turbine and a power recovery turbine mechanically coupled to the compressor to drive the same are also provided. The power recovery turbine may be connected between the aircraft exhaust air outlet and the cabin air outlet. The combustion turbine may be connected to the compressor outlet or to the cabin air outlet. A motor generator is coupled to the compressor and the turbine and operable to drive the compressor when operating as a motor and to be driven by the turbines when acting as a generator. The combustor is connected to the combustion turbine for selectively providing gases of combustion to the turbine to drive the same to allow operation as an auxiliary power unit and a heat exchanger having first and second fluid flow paths in heat conducting relation with one another is provided. The first flow path serves to interconnect the compressor and the cooling system inlet while the second flow path serves to interconnect the cabin air outlet and the power recovery turbine. The use of the heat exchanger allows rejection of heat from the compressed air flowing from the compressor to the cabin air outlet stream to add energy thereto prior to such stream being used to drive either turbine to recover energy from the stream.

Other objects and advantages will become apparent from the following specification taken in connection with the accompanying drawing.

DESCRIPTION OF THE PREFERRED EMBODIMENT

Figure 1:
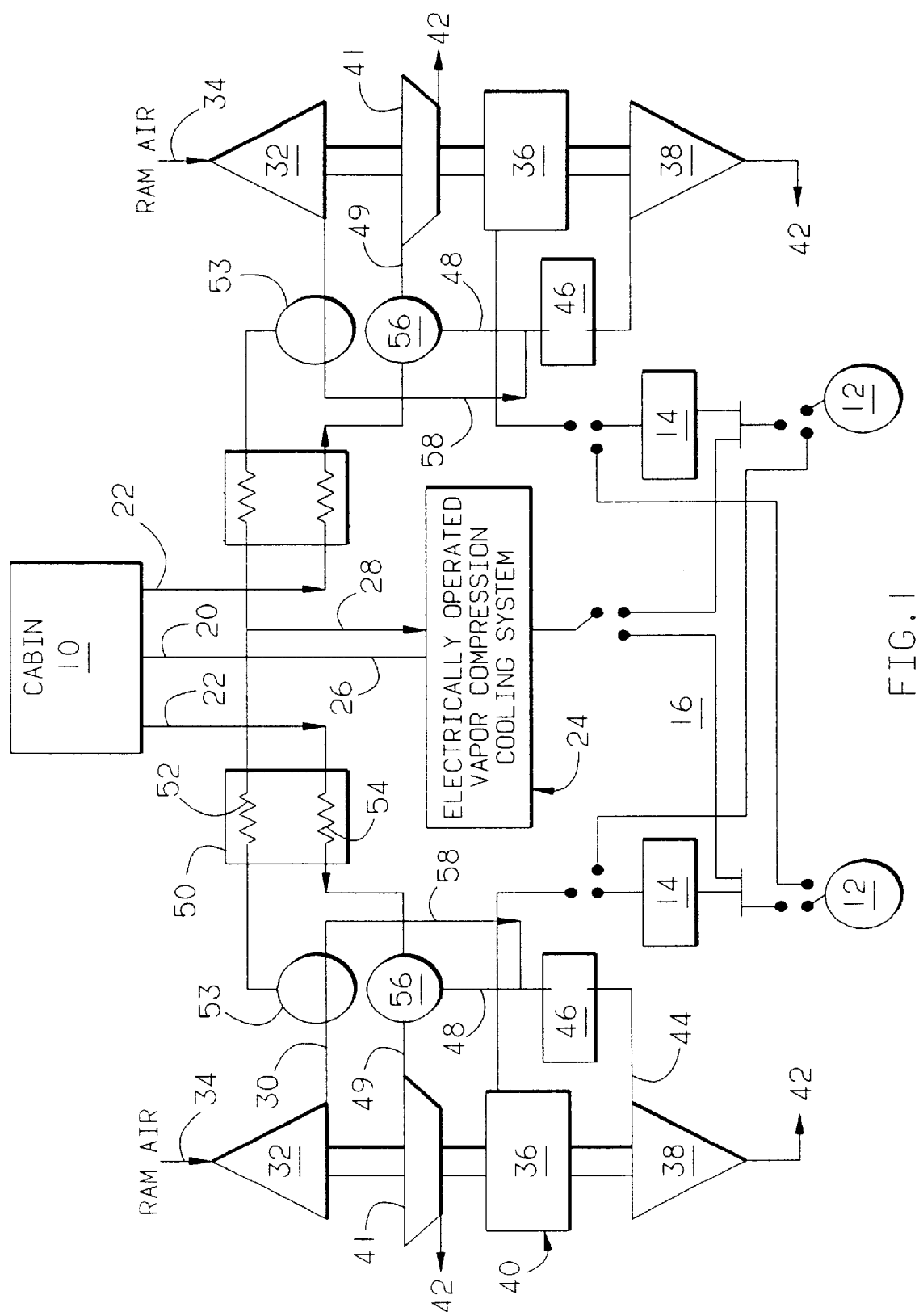
FIG. 1 is a schematic of a multiple mode ECS system made according to the invention and illustrating the various components configured in such a way as to provide an auxiliary power unit (APU) mode of operation.

An exemplary embodiment of the invention is shown in the Figure in connection with an aircraft having a sealable, pressurizable cabin 10. Conventionally, two or more gas turbine main propulsion engines are provided for propelling the aircraft and each such engine includes a conventional starter generator 12 (only two of which are shown). The starter generators 12 provide power to two identical motor speed control systems 14 of conventional construction and various wiring, generally designated 16, provides for cross-connection of the components as desired.

Returning to the cabin 10, the same includes a cabin air inlet 20 as well as a cabin air outlet 22, two such outlets 22 being shown. Pressurized, conditioned air is admitted to the cabin 10 through the inlet 20 and is taken from an electrically operated, vapor compression cooling system, generally designated 24, of conventional construction which is connected by the wiring 16 to receive electrical power from the starter generators 12. The cooling system 24 has an outlet 26 for cabin air which is connected to the cabin air inlet 20 of the cabin 10 as well as an inlet 28. The cooling system inlet 28 is illustrated as being connected ultimately to the outlets 30 of two compressors 32. The compressors 32 are in turn connected to ram air inlets 34 which may be of conventional construction. As a result, ram air is compressed by each compressor 32 to the cabin pressure and delivered to the cooling system 24 via it's inlet 28 for ultimate distribution within the cabin 10. As is well known, some provision for recirculation of some part of the cabin air will conventionally be employed but is not shown in the drawing.

Mechanically coupled to each of the compressors 32 is an electrical motor generator 36 which, when operating as a motor, is controlled by the associated motor speed control 14 and will provide all or part of the power required to drive the associated compressor 32.

Each motor generator 36 is also coupled to a combustion turbine 38 forming part of the same turbomachine, generally designated 40, including the associated compressor 32 and, of course, the motor generator 36 as well as a low pressure, power recovery turbine 41. Each motor generator 36 may be driven by it's associated combustion turbine 38 to provide an auxiliary power unit function as will be more apparent hereinafter. The combustion turbines 38, of course, drive the corresponding compressors 32 as well. The power recovery turbines 41 can be employed to assist each motor generator 36 in driving its associated compressor 32.

Each turbine 38 and 41 has an outlet connected to an aircraft exhaust outlet 42 which dumps expanded gas from the associated turbine 38 or 41 to the exterior of the aircraft, that is, to the ambient. Each turbine 38 has an inlet 44 connected to a conventional combustor 46 which burns fuel to produce hot gases of combustion capable of driving the associated turbine 38. Combustion air for each combustor 46 is received through a duct 48 that is ultimately connected to the outlet 30 of the associated compressor 32 as will be seen. Each turbine 41 has an inlet 49 which may be connected to the cabin air outlet 22 of the cabin 10 for power recovery purposes.

Two air/air heat exchangers, each generally designated 50, are provided, one for each of the turbomachines 40. Each heat exchanger 50 includes a first fluid flow path or conduit 52 which is connected via a valve 53 to the compressor outlet 30 of the associated compressor 32 and to the cooling system inlet 28. Each heat exchanger 50 also includes a second fluid flow path or conduit 54 in heat exchange relation with the first fluid flow path 52 and which is connected to the corresponding cabin air outlet 22 of the cabin 10, and may be connected to the combustor 46 for the associated combustion turbine 38 or to the inlet 49 for the power recovery turbine 41. A valve 56 determines whether the connection is to the combustor 46 or the inlet 49. As a consequence of this construction, relatively cool cabin exhaust air will cool relatively warm compressed ram air from the compressor 32 prior to it's admission to the cooling system 24 via the inlet 28 thereby substantially reducing the heat load on the cooling system 24. In addition, the rejection of heat from the compressed ram air to the cabin exhaust air within each heat exchanger 50 adds energy to the corresponding exhaust air stream, increasing the amount of work that may be performed when such stream is expanded in the corresponding power recovery turbine 41 or combusts fuel in the combuster 46.

In some instances, it may be desirable to include a bypass duct such as a duct 58 to connect the compressor outlet 30 to the combustor 46 for a given turbomachine 40. Thus, the bypass duct 58 is connected to the valve 53 which may direct air flow either through the first fluid flow path 52 or through the bypass duct 58.

FIG. 1 illustrates the system configured to operate as an auxiliary power unit (APU). In this mode of operation, the valve 53 is configured to direct compressed ram air from the compressor 32 to the combustor 46 where it is used to support the combustion of fuel to provide gas to drive the turbine 38. This in turn drives the motor generator 36 which is operated in a power generation mode to produce electrical power. The valve 56 is configured so as to prevent any flow whatsoever therethrough to provide isolation of the combustor 46 from the remainder of the system.

The system is operating in a true APU mode when so configured in that electrical power is being generated at the turbomachine 40 apart from and in addition to any electrical power being generated by the electrical systems of the main propulsion engines for the aircraft.

Figure 2:
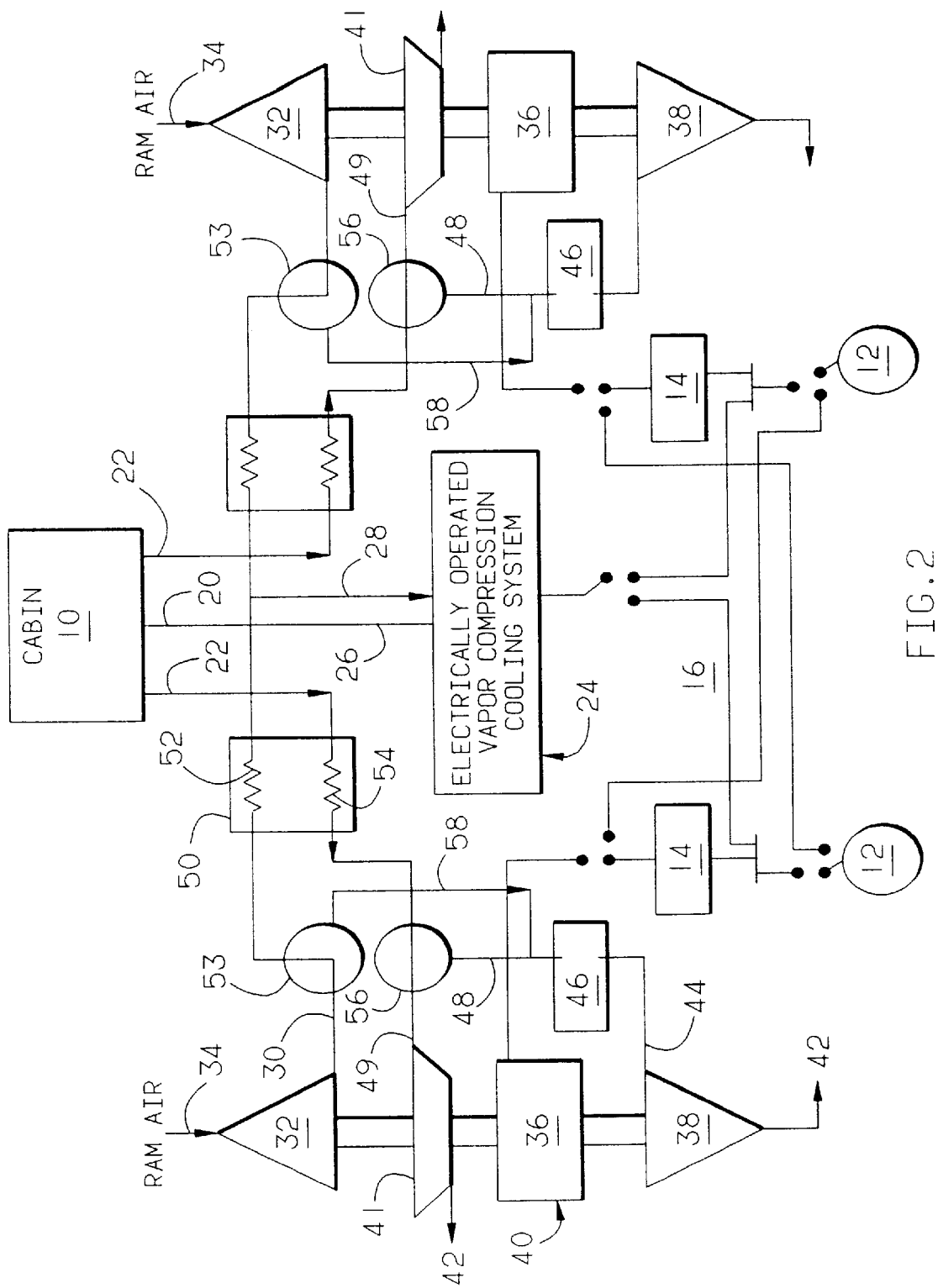
FIG. 2 is a view similar to FIG. 1 but illustrating the components in a configuration to place the system in a cabin pressurization and ventilation mode with energy recovery.

FIG. 2 illustrates the configuration of the system in a pure cabin pressurization and ventilation mode while providing for energy recovery. In this mode of operation, the valve 53 is configured to pass the ram air stream from the outlet 30 of the compressor 32 through the heat exchanger 50 to the inlet 28 of the vapor compression cooling system 24. Cooled ram air is then flowed to the cabin via the cabin inlet 20 and ultimately passed from the cabin outlet 22 through the flow path 54 in the heat exchanger 50 where heat is rejected to it from the incoming ram air stream in the path 52. The now heated cabin exhaust air is passed by the valve 56 to the inlet 49 to the power recovery turbine 41. The energy of this stream is recovered by the power recovery turbine 41 which assists the motor generator 36 in driving the ram air compressor 32. In this mode of operation, the combustor 46 is not used and some of the power recovered will be utilized in overcoming windage losses within the combustion turbine 38.

Figure 3:
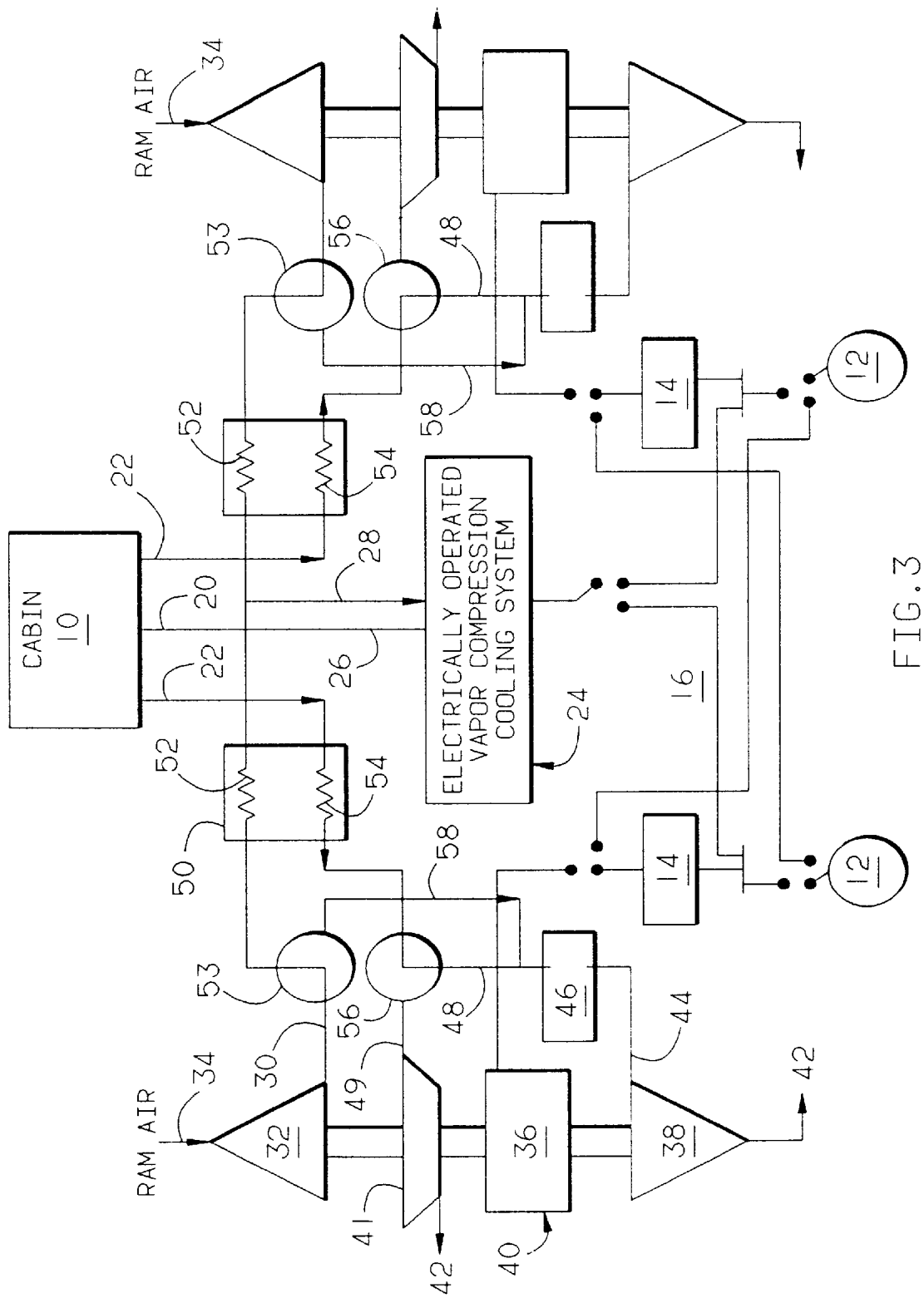
FIG. 3 is a view similar to FIGS. 1 and 2 but illustrating the components in a configuration to provide a cabin pressurization mode while producing electrical power.

FIG. 3 illustrates the configuration of the system when the same is being operated in a cabin pressurization and ventilation mode and is to generate electrical power over and above that being generated by the electrical systems of the main propulsion engines. In this case, the valve 53 is configured to provide ram air to the heat exchanger 50 and to the vapor compression cooling system 24 as before. The ram air is then cooled and directed to the cabin. Air exhausted from the cabin is returned through the heat exchanger 50 where heat from the incoming ram air stream is rejected to it. This exhaust stream is then directed by the valve 56 to the combustor 46 to support the combustion of fuel. The resulting gases are then used to drive the combustion turbine 38. This in turn will operate the compressor 32 as well as drive the motor generator 36. The latter will be configured as a generator and will convert the power thus generated to additional electrical power. Thus, net electrical power production is possible in this mode with cabin pressurization/ventilation being provided as well.

In the dual system form of the invention illustrated in FIGS. 1–3, the right hand system may continue to operate to pressurize and ventilate the cabin 10 while the left hand unit is being used in the auxiliary power unit mode. As an example of a future aircraft utilizing electrical equipment to a greater degree than heretofore, an approximately 275 passenger aircraft embodying conventional technology might require four conventional pressurization units to be installed with three units being capable of supplying the required air mass flow rate at approximately 40,000 feet of altitude. Each unit could provide one pound per second of air flow at this altitude. Thus four units each having one pound per second compressor air flow at 40,000 feet altitude are capable of approximately 400 horsepower net output at sea level, using modern day APU specific power ratings, approximating 100 horsepower per pound per second of air flow per unit. This in turn would allow a unit to generate approximately 250 kilowatts of conditioned electrical power at sea level. This power could then be used for starting of the main propulsion engines or for sustaining ground operation if the motor generator 36 is sized appropriately.

Moreover, in low to mid altitude flight, where the aircraft may encounter icing conditions, in the APU mode, the system could produce some excess electrical power for electrothermal anti-icing of the aircraft. Alternatively, the compressor 32 could be operated to deliver some hot bleed air for hot air impingement anti-icing to those surfaces requiring it as is the current anti-icing practice in most commercial aircraft. It would be necessary to employ the APU mode at low altitude rather than the cabin pressurization mode with net electrical power generation because at low altitudes, the pressure ratio between the cabin and the exhaust is too low to produce significant power.

Utilizing the cabin pressurization mode with the power recovery turbine 41 assisting the motor generator 36 at altitude minimizes the amount of electrical power that must be produced by the generators 12 of the main propulsion engines. If one or more of the engine generators 12 fail, the cabin pressurization mode can become a net electrical producer by directing the cabin discharge flow through the combustion turbine 38 to replace the energy lost as a result of such failure.

It will therefore be appreciated that an APU based environmental control system for pressurized aircraft made according to this invention is capable of operating in multiple modes while providing a means whereby a vapor compression cooling system to provide cabin cooling and ventilation has its heat load substantially reduced through the judicious use of the heat exchangers 50. Moreover, because heat is rejected to the exhaust air stream within the heat exchangers 50 prior to its admission to the combustion turbine 38 and/or the power recovery turbine 41, energy recovery of the system is greatly enhanced, thereby increasing system efficiency.

I claim:

1. A multiple-mode auxiliary power unit based environmental control system for a pressurizable-cabin aircraft having a cabin air inlet and a cabin air outlet comprising:
   a ram air inlet;
   an environmental control system exhaust outlet;
   a cabin air cooling system including an inlet and an outlet;
   said environmental control system exhaust outlet being connected to said cabin air inlet;
   a turbomachine including a compressor connected between said ram air inlet and said cooling system inlet, a combustion turbine and a power recovery turbine mechanically coupled to said compressor, said turbines being connected between said environmental control system exhaust outlet and said cabin air outlet;
   a motor generator coupled to said compressor and said turbines; and
   a combustor connected to said combustion turbine.

2. The multiple-mode environmental control system of claim 1 further including a heat exchanger having first and second flow paths in heat exchange relation with one another, said first flow path interconnecting said compressor and said cooling system inlet, and said second flow path interconnecting said cabin air outlets and said turbines.

3. The multiple-mode environmental control system of claim 2 further including a first selectively operable duct interconnecting said compressor and said combustion turbine and bypassing said heat exchanger, and a second selectively operable ducting system that can interconnect said heat exchanger and said power recovery turbine or alternatively interconnect said heat exchanger with said combustion turbine or alternatively close off flow from said heat exchanger entirely.

4. A multiple-mode auxiliary power unit based environmental control system for a pressurizable aircraft cabin having a cabin air inlet and a cabin air outlet, comprising:
   a ram air inlet;
   an environmental control system exhaust outlet;
   a cabin air cooling system including an inlet and an outlet,
   said environmental control system exhaust outlet being connected to said cabin air inlet;
   a turbomachine including a compressor connected between said ram air inlet and said cooling system inlet, and a combustion turbine and a power recovery turbine mechanically coupled to said compressor, said turbines being connected between said environmental control system exhaust outlet and said cabin air outlet;
   a motor generator coupled to said compressor and said turbines; and
   a heat exchanger having first and second flow paths in heat exchange relation with each other, said first flow path serving to interconnect said compressor and said cooling system flow path and said second flow path serving to interconnect said cabin air outlet and said turbines.

5. The multiple mode environmental control system of claim 4 wherein said cabin air cooling system is an electrically operated vapor compression cooling system.

6. A multiple mode auxiliary power unit based environmental control system of claim 4 further including a combustor connected between said combustion turbine and said second flow path.

7. The environmental control system of claim 6 further including means to isolate said combustor from said cabin air outlet.

8. The multiple-mode environmental control system of claim 4 further including a first selectively operable duct interconnecting said compressor and said combustion turbine and bypassing said heat exchanger, and a second selectively operable ducting system that can interconnect said heat exchanger and said power recovery turbine or alternatively interconnect said heat exchanger with said combustion turbine or alternatively close off flow from said heat exchanger entirely.

9. The multiple mode auxiliary power unit based environmental control system of claim 4 wherein there are two or more said turbomachines, two or more said heat exchangers, and two or more said motor generators, each of the turbomachines connected to corresponding one of said heat exchangers and coupled to a corresponding one of said motor generators.

10. A multiple-mode auxiliary power unit based environmental control system for a pressurizable aircraft cabin having a cabin air inlet and a cabin air outlet, comprising:
    a ram air inlet;
    an environmental control system exhaust outlet;
    a cabin air cooling system including an inlet and an outlet;
    said environmental control system exhaust outlet being connected to said cabin air inlet;
    a turbomachine including a compressor connected between said ram air inlet and said cooling system inlet, and one or more turbines mechanically coupled to said compressor, said one or more turbines being connected between said environmental control system exhaust outlet and said cabin air outlet;
    a motor coupled to said compressor and said one or more turbines; and
    a combustor connected to one or more of the turbines.

11. A multiple-mode auxiliary power unit based environmental control system for a pressurizable aircraft cabin having a cabin air inlet and a cabin air outlet, comprising:
    a ram air inlet;
    an environmental control system exhaust outlet;
    a cabin air cooling system including an inlet and an outlet;
    said environmental control system exhaust outlet being connected to said cabin air inlet;
    a turbomachine including a compressor connected between said ram air inlet and said cooling system inlet, and turbines mechanically coupled to said compressor, said turbines being connected between said environmental control system exhaust outlet and said cabin air outlet;

a motor coupled to said compressor and said turbines; and a heat exchanger having first and second flow paths in heat exchange relation with each other, said first flow path serving to interconnect said compressor and said cooling system flow path and said second flow path serving to interconnect said cabin air outlet and said turbines.

12. A multiple-mode auxiliary power based environmental control system for a pressurizable aircraft cabin having a cabin air inlet and a cabin air outlet, comprising:

a ram air inlet;

an environmental control system exhaust outlet;

a cabin air cooling system including an inlet and an outlet;

said environmental control system exhaust outlet being connected to said cabin air inlet;

one or more turbomachines, each including a compressor connected between said ram air inlet and said cooling system inlet, and a combustion turbine and a power recovery turbine mechanically coupled to said compressor, said turbines being connected between said environmental control system exhaust outlet and said cabin air outlet;

one or more motor generators, each coupled to said compressor and said turbines;

one or more heat exchangers, each having first and second flow paths in heat exchange relation with each other, said first flow path serving to interconnect said compressor and said cooling system flow path and said second flow path serving to interconnect said cabin air outlet and said turbines; and at least one said turbomachine having a selectively-operable duct interconnecting said compressor and said combustion turbine, and bypassing said heat exchanger, and a second selectively-operable ducting system that can interconnect said heat exchanger and said power recovery turbine or alternatively interconnect one or more of said heat exchangers with a corresponding one of said combustion turbines or alternatively halt flow from said heat exchanger to any of said turbines.

* * * * *